3,575,715
ULTRA-THIN FILM ELECTROLYTE ELECTRO-
CHEMICAL DEVICES AND FABRICATION
METHODS THEREFOR
Joseph I. Masters, Lexington, Paul Vouros, Cambridge,
and James P. Clune, Danvers, Mass., assignors to
Technical Operations, Incorporated, Burlington, Mass.
Filed Aug. 20, 1968, Ser. No. 754,018
Int. Cl. H01m 11/00
U.S. Cl. 136—83
14 Claims

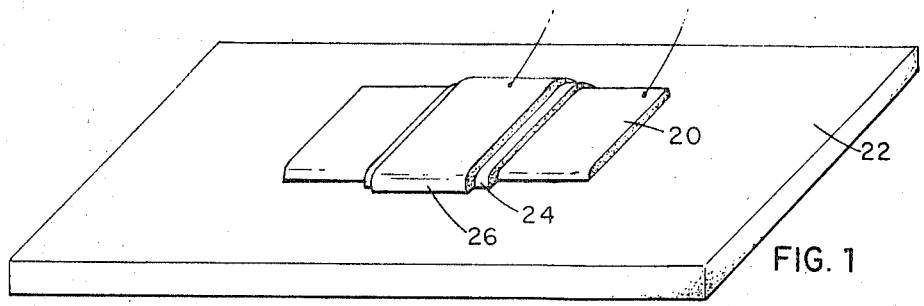
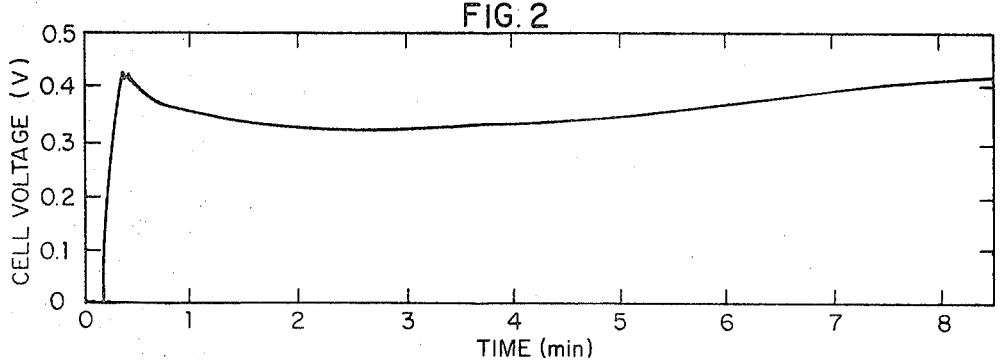
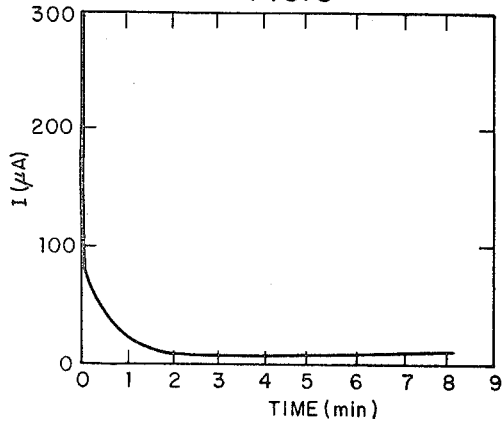
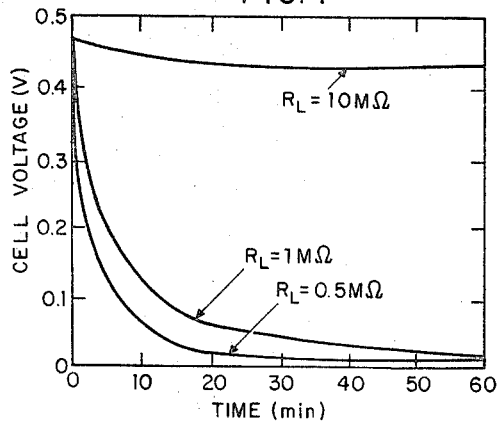
JOSEPH I. MASTERS
PAUL VOUROS
JAMES P. CLUNE
INVENTOR
BY: ALFRED H. ROSEN
and
JOHN H. COULT
ATTORNEYS United States Patent Office 3,575,715
Patented Apr. 20, 1971

ABSTRACT OF THE DISCLOSURE

This disclosure depicts ultra-thin film solid electrolyte devices for use as batteries, sensors, and the like, comprising electrodes and solid electrolytes all formed by vacuum deposition. Evaporated electrolyte layers of silver bromide, silver iodide, and potassium silver iodide ($KAg_4I_5$) are disclosed. Novel fabrication methods are shown, especially for minimizing ionic and interface resistance in such devices.

BACKGROUND OF THE INVENTION

The solid-state electrochemical devices to which this invention relates are susceptible of many and diverse applications. A printed battery represents perhaps the most promising application. Solid-state batteries, unlike conventional batteries that employ the well-known but troublesome liquid electrolytes, for the most part offer many advantages over liquid electrolyte devices. They are, in general, corrosion-proof, susceptible to miniaturization, and have long shelf lives. The salient drawback of solid electrolyte batteries to date has been their relatively high internal resistance and in the case of concentration cells, their relatively low energy output. Mrgudich describes concentration cell type batteries with a pellitized silver iodide electrolyte having internal resistances in the order of 50KΩ to 3MΩ/cm.² (see the December, 1965 issue (vol. AES-1, No. 3) of the IEEE Transactions on Aerospace and Electronics Systems; also, other pertinent articles: Science Conference Proceedings, Office, Chief of Research and Development, Department of the Army, Washington, D.C.; Preliminary Report on a Rechargeable, Solid-Electrolyte Battery, Proc. of 19th Annual Power Sources Conference, pp. 86–88.). This range is many orders of magnitude higher than found in liquid electrolyte batteries of equivalent performance. This property has had a depressing effect upon the development of solid electrolyte devices. An exhaustive review of work done on solid-state electrochemical devices has been compiled by A. B. Lidiard in Handbuch der Physik (Berlin: Springer-Verlag, 1957) vol. 20, p. 250. The above-cited Mrgudich and Lidiard articles and the references cited in these works are incorporated by reference herein as background material.

The high internal resistance of solid-state electrochemical devices is attributable to: (1) the poor ionic conductivity of the electrolyte material, and (2) the boundary resistance generated at one or both of the electrode-electrolyte interfaces. The discussion to follow includes methods we have devised to reduce the internal resistance of solid electrolyte devices arising from each of these factors.

Attempts to reduce the ionic resistance of devices having a silver halide electrolyte, a very widely investigated class of solid electrolyte materials, by employing a very thin electrolyte layer have been thwarted by the extreme difficulty of depositing an ultra-thin continuous layer of silver halide material without producing voids in the layer which are apt to cause short circuiting through the layer.

OBJECTS OF THE INVENTION

It is an object of this invention to provide ultra-thin film solid electrolyte electrochemical devices which have lower D.C. internal resistance than previously attainable, and methods for fabricating such devices to achieve such minimization of internal resistance. It is a specific object to surmount the problem of void or "pinhole" development in ultra-thin silver halide layers.

It is another object to provide solid electrolyte electrochemical devices having significantly higher energy density capabilities than are found in prior art devices.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawing wherein:

FIG. 1 schematically illustrates an ultra-thin film solid electrolyte electrochemical device fabricated in accordance with this invention;

FIG. 2 characterizes the variation of open circuit voltage (OCV) with time during deposition of the silver electrode; and FIGS. 3 and 4 represent typical charge and discharge curves for an ultra-thin film Pt/AgI/Ag cell constructed in accordance with this invention.

DESCRIPTION OF THE PREFERRED EMBODIMENTS

Consider the electrochemistry of a platinum/silver iodide/silver concentration cell in terms of aqueous potential theory. At the Ag/AgI interface there is a spontaneous potential given by the couple $$Ag°_{(a_1)} = Ag^+ + e^- \qquad (1)$$

where $a_1$ is the activity of free silver at the silver electrode. The platinum electrode acts as an inert electrode from which an interstitial $Ag^+$ ion may attract an electron to form deposited $A°$, thus establishing the equilibrium $$Ag^+ + e^- = Ag°_{(a_2)} \qquad (2)$$

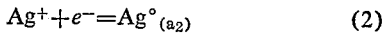

where $a_2$ is the activity of free silver at the platinum electrode.

When the outer circuit is closed, the net cell reaction will be given by the sum of Equations 1 and 2 corresponding to $$Ag°_{(a_1)} = Ag°_{(a_2)} \qquad (3)$$

The potential (E) of the cell will be given by $$E = \frac{RT}{nF} \ln \frac{a_1}{a_2} \qquad (4)$$

where F is the Faraday constant, T the absolute temperature, and R the gas constant in electron volts. Since the activity of free silver in silver is constant, the cell EMF becomes inversely proportional to the silver activity at the platinum electrode. The cell will cease to function as a battery when the platinum electrode becomes saturated with free silver ($a_2 = a_1$), in which case we have the symmetrical Ag/AgI/Ag system. The Pt/AgI/Ag cell is a concentration cell and can be recharged by applying a positive potential to the platinum electrode and driving the deposited free silver back into "solution" as $Ag^+$ ions, and thus, replenishing the silver lost from the silver electrode during the discharge cycle. The charging voltage should not exceed approximately 0.685 v., which is the decomposition potential of AgI into $I_2$ and $Ag°$.

The procedure used for the fabrication of a cell, for example a Pt/AgX/Ag cell, is generally as follows (see FIG. 1). The platinum electrode 20 is deposited on a substrate 22 by sputtering. A CVC AST–100 low energy sputtering unit may be employed, and 2.5 cm. long platinum films with resistances of 50 to 60Ω or less may be deposited at a pressure of $2\times10^{-3}$ mm. Hg. The target voltage is preferably about 600 v., and the substrate (quartz, for example) placed approximately 6 inches from the target.

This is followed by the direct evaporation of a silver bromide or silver iodide film 24 on portions of the substrate. Films of silver bromide and silver iodide, preferably 4–12$\mu$ in thickness, may be deposited off a tungsten boat at a pressure of $3\times10^{-5}$–$5\times10^{-5}$ mm. Hg. The boat temperature is kept constant during the evaporation in the range 550°–680° C., preferably at 643° and 560° for AgBr and AgI, respectively.

An interference measurement technique may be used to determine the thickness of the silver bromide film by placing a triacetate film next to the quartz substrate as a reference during the evaporation. We used a gravimetric method to estimate the thickness of deposited silver iodide based on the bulk density of AgI.

Finally the silver electrode 26 is evaporated by masking off the platinum-covered portions of the substrate.

Electrical contact was established with the thin-film electrodes by cementing fine electrical wires to the electrodes with the conductive Eccobond Solder No. 56C, because the adherence of this cement to the film is excellent and causes no breaks in the film.

As indicated above, devices with ultra-thin electrolytes offer minimized ionic resistance, but are inseparably associated with the short circuiting ("pinhole") problem. An investigation into the nature of the formation of vacuum deposited silver halide films reveals that voids are formed in the microstructure of deposited silver halide films, void formation being much more severe with evaporated silver iodide films than with silver bromide films. In accordance with this invention, we have devised methods for overcoming the pinhole problem in thin films of silver halide, especially silver iodide.

We have found that the continuity of vacuum-deposited silver halide films is significantly improved by purifying the silver halide evaporant to reduce the concentrations of foreign materials such as cadmium, copper, iron, lead, and nickel. Purification of the silver halide before introduction into an evaporator for evaporation upon the selected substrate may be accomplished by heating the silver halide to a molten state and then causing it to flow into a pool of water, preferably triply distilled, held at just below its boiling point. As drops of the molten halide penetrate the water, the drops are pelletized with local boiling of the water and crazing and fragmentation of the halide pellets, producing a large surface interface between the halide and the water for efficient leaching of impurities. The resultant silver halide pellets may then be dried at 200° C. As stated above, the improvement in uniformity of the evaporated silver halide films is due at least in large measure, to the reduction of volatile impurities to a very low level in the silver halide charge by the foregoing treatments. The concentration of impurities is reduced to a point where the concentration of the named impurities in the deposition on the substrate during evaporation is essentially nil. The exact concentration of the impurity elements cannot be stated with certainty; however, it is believed that the residual impurities represent in the order of one part per million, or less.

As suggested, in spite of the greater susceptibility of silver iodide to the formation of voids, silver iodide is preferred over silver bromide as an electrolyte for a number of reasons. First, silver iodide has lower resistance to the conduction of ions. Second, a silver iodide electrolyte exhibits greater stability being less apt to release its halogen component as a result of photolytic and/or electrolytic action. Third, AgI has made lower electronic conductivity. We have devised a number of methods for overcoming the problem of void formation in silver iodide films.

A first method involves heating the substrate (for example, quartz) to enhance the surface mobility of the evaporated gas to produce an agglomeration of the grains. The result is a filling of the voids in the film. We found that the voids became progressively smaller as the substrate temperature was increased, a continuous structure being formed at or about 200° C. substrate temperature.

We have found that recording of the open circuit voltage (OCV) of a cell during its formation in a vacuum enables us to study the electrical properties of thin-film cells as a function of time during deposition. FIG. 2 shows typical OCV vs. time curves during deposition of the silver electrode.

FIG. 3 shows a typical transient charging curve for a cell formed as just described. FIG. 4 shows a series of discharge curves for the same cell for loads of .5MΩ, 1MΩ, and 10MΩ. The cell tested exhibited excellent voltage stability when charged to .5 v.

Yet another method for fabricating cells so as to avoid pinhole formations in the electrolyte is to form a multilayer silver halide electrolyte. After depositing the platinum electrode, a thin layer of silver chloride or silver bromide may be deposited followed by the evaporation of a thin layer of silver iodide. This technique compromises the higher ionic resistivity of silver bromide or silver chloride with the continuity of these materials. It was found that cells formed by this technique were substantially void-free and maintained their charge voltage for extended periods of time, but that the D.C. internal resistance of such cells is much higher than that of cells having a pure silver iodide or silver bromide electrolyte. We concluded that the increased internal resistance is due in large part to the contact resistance formed between the silver iodide and silver chloride (or bromide) films.

It was found that silver bromide may be evaporated in very thin continuous layers without the formation of voids by using the above-described halide pelletizing method; the fabrication of cells with a silver bromide electrolyte material is thus achievable without the above-described special procedures for eliminating voids in silver iodide films.

As stated it was found that the primary contribution to the internal resistance of thin film cells is by the electrode-electrolyte interface effects. In accordance with this invention, it was found that the interface resistance is lowered by a cathodic mixing technique substantially as follows. Rather than producing a discrete boundary between the electrode and electrolyte, it was found to be advantageous to provide an interface or transition layer in which a mixture of the electrode and electrolyte materials are formed. This may be accomplished by alternately evaporating very thin (for example, 50–100 A.) layers of first the electrolyte material and then the electrode material. Alternatively, the boundary layer may be formed by vacuum depositing a mixture of the electrode and electrolyte material. This technique may be applied at both the anode-electrolyte and cathode-electrolyte interfaces.

This invention is not limited to the particular details of construction of the embodiments and methods depicted, and it is contemplated that various and other modifications and applications will occur to those skilled in the art. Single cell units have been described; however, the methods taught by this invention may be readily used by those skilled in the art to fabricate stacked arrays of all units. Potassium and other metal mixtures, e.g. rubidium, silver halide materials, may be used as the electrolyte material.

Since certain changes may be made in the above-described articles and methods without departing from the true spirit and scope of the invention herein involved, it is intended that the subject matter of the above depiction

What is claimed is:

1. A method of making ultra-thin film solid electrolyte electro-chemical devices comprising:
vacuum depositing upon a base a first electrode comprising a thin layer of an electron-conductive material;
evaporating in succession a thin layer of silver bromide electrolyte upon said first electrode and a thin layer of silver iodide electrolyte upon said silver bromide layer; and
vacuum depositing upon the laminate formed a second electrode comprising a thin layer of an electron-conductive material.

2. The method of claim 1 wherein said electrolyte compound is purified before evaporation by pelletizing in water from a molten state.

3. The method of claim 2 wherein said water is distilled water.

4. The method of claim 3 wherein said water is maintained at a temperature close to its boiling point.

5. The method of claim 4 wherein the evaporation pressure is between about $10^{-3}$ and $10^{-5}$ millimeters of mercury, the temperature of evaporation is between about 550° C. and about 675° C., and the thickness for the evaporated electrolyte material is between about 4 and 12 microns.

6. The method of claim 5 wherein said silver halide compound is purified before evaporation by pelletizing in distilled water from a molten state.

7. The method of claim 6 wherein said water is maintained at a temperature close to its boiling point.

8. The method of claim 7 wherein said first and second electrode materials are silver and platinum.

9. A method of making ultra-thin film solid electrolyte electro-chemical devices comprising:
vacuum-depositing upon a base a first electrode comprising a thin layer of an electron-conductive material;
vacuum depositing on said first electrode a plurality of interleaved layers of respectively an electrolyte and said electrode materials, said interleaved layers being very thin relative to said first electrode;
vacuum depositing a thin layer of silver halide electrolyte material upon said interleaved layers; and
vacuum depositing upon the laminate formed a second electrode comprising a thin layer of an electron-conductive material.

10. The method of claim 9 wherein said interleaved layers of ionically and electronically conductive materials are composed of said first electrode and electrolyte materials, respectively.

11. The method of claim 10 wherein said electrode material is platinum, and wherein said electrolyte material is selected from the group consisting of silver bromide and silver iodide.

12. An ultra-thin film solid electrolyte device comprising:
a first electrode comprising a thin vacuum-deposited layer of silver;
an electrolyte comprising a thin vacuum-deposited layer of a first silver halide material on said first electrode and a thin vacuum-deposited layer of a second silver halide material on said layer of said first silver halide material said second silver halide being different than said first silver halide; and
a second electrode on said layer of said second silver halide material comprising a thin vacuum-deposited layer of platinum.

13. The device of claim 12 wherein said electron-conductive materials constituting said first and second electrodes differ such that said device formed constitutes a battery.

14. An ultra-thin film solid electrolyte device, comprising:
a first electrode comprising a thin vacuum-deposited layer of silver;
an electrolyte on said first electrode comprising at least one thin vacuum-deposited layer of a silver halide compound on said first electrode;
a plurality of interleaved thin vacuum-deposited layers of respectively said electrolyte and said electrode materials at the interface between said first electrode and electrolyte, said interleaved layers being very thin relative to said first electrode and to said electrolyte; and
a second electrode on said electrolyte comprising a thin vacuum-deposited layer of platinum.

References Cited

UNITED STATES PATENTS

| | | | |
|---|---|---|---|
| 2,928,890 | 3/1960 | Van der Grinten et al. | 136—83 |
| 3,186,875 | 6/1965 | Freeman, Jr. | 136—83 |
| 3,305,394 | 2/1967 | Kaiser et al. | 117—217 |
| 3,363,998 | 1/1968 | Keister et al. | 117—217 |
| 3,375,135 | 3/1968 | Moulton et al. | 136—83 |
| 3,445,281 | 5/1969 | Sullivan | 117—217 |
| 3,463,663 | 8/1969 | Chopra | 117—217 |

WINSTON A. DOUGLAS, Primary Examiner

C. F. LEFEVOUR, Assistant Examiner

U.S. Cl. X.R

136—153, 175; 117—217